United States Patent
Weibel, Jr. et al.

[11] 3,800,551
[45] Apr. 2, 1974

[54] MODULATED SUCTION THROTTLING VALVE

[75] Inventors: John Weibel, Jr.; Richard E. Widdowson, both of Dayton, Ohio

[73] Assignee: General Motors Corporation, Detroit, Mich.

[22] Filed: Mar. 8, 1973

[21] Appl. No.: 339,392

[52] U.S. Cl. .................................. 62/217, 62/224
[51] Int. Cl. ........................................... F25b 41/04
[58] Field of Search ............. 62/217, 218, 219, 224, 62/225; 236/92

[56] References Cited
UNITED STATES PATENTS
| | | | |
|---|---|---|---|
| 3,296,816 | 1/1967 | Weibel................................. | 62/217 |
| 3,738,119 | 6/1973 | Scherer et al......................... | 62/217 |
| 3,744,268 | 6/1973 | Widdowson ........................... | 62/217 |

Primary Examiner—Meyer Perlin
Attorney, Agent, or Firm—J. C. Evans

[57] ABSTRACT

A suction throttling valve for an automatic refrigerant system including a continuously operated compressor connected to the outlet of an evaporator, including a housing having an inlet and an outlet connected between the evaporator and compressor and a valve piston for controlling refrigerant flow between the inlet and outlet in accordance with pressure conditions within the evaporator. Pressure within the evaporator and air flow temperature is preset by controlling pressure differential across the valve piston by means including a pilot control valve; a movable valve seat is positioned by manual control means to change the pressure control point at which the valve piston controls evaporator pressure to modulate air flow temperature from the evaporator.

6 Claims, 6 Drawing Figures

MODULATED SUCTION THROTTLING VALVE

This invention relates to refrigerant control systems and more particularly to suction throttling valves for controlling the pressure of the evaporator of an automotive refrigerant system including a continuously operated compressor.

One approach to the control of automotive air conditioning systems of the type including a continuously operated compressor is to have a suction throttling valve interposed between the evaporator and the compressor of the system. Such valves are responsive to conditions in the evaporator and are operated to a preset control point to maintain an evaporator pressure slightly above a point at which moisture freezes on the external surface of the evaporator.

Ambient air directed from exteriorly of the vehicle across the evaporator is discharged into the passenger compartment of the vehicle. Air passing across an evaporator maintained with its surface near feeezing can be uncomfortable. One method to avoid overly chilled air is to direct a predetermined amount of the air from the evaporator across a heater core to cause the air temperature to be tempered. This is accomplished by the provision of temperature valves and duct means which will divert a predetermined percentage of the air from the evaporator across a heater core which must be mounted in the duct system and then the air is mixed before it is directed into the passenger compartment.

An object of the present invention is to eliminate the need for a heater in an automotive air conditioning system to moderate the temperature of air passing from the evaporator of the automotive refrigerant system.

Another object of the present invention is to control the temperature of inlet air from a duct system of an automotive air conditioning system by means of an improved suction throttling valve incorporating manually adjustable means for modulating the set control pressure in an evaporator to avoid excessive cooling of air passing into the passenger compartment of the vehicle.

Still another object of the present invention is to control the temperature of air passing from the evaporator of an automotive air conditioning system without cycling the compressor on and off and by the provision of means which enable the discharge air temperature and humidity level to be maintained at a modulated control point by manually actuatable means accessible from the interior of the passenger compartment.

Yet another object of the present invention is to provide an improved suction throttling valve of the type including a pressure controlled piston valve interposed between the evaporator of a refrigerant system and a continuously operated compressor thereof and which is maintained normally closed when the pressure within the evaporator reaches a predetermined level and which opens to communicate the evaporator with the compressor to reduce the pressure within the evaporator for maintaining a predetermined cooling effect therein and wherein a condition responsive valve is associated with the piston for changing the control of pressure differential thereacross to vary the preset control pressure within the evaporator in accordance with the position of a manually adjustable controller.

These and other objects of the present invention are attained in one working embodiment which is associated with an automotive air conditioning system of the type including a continuously operated compressor discharging refrigerant through a condenser thence across an expansion valve for controlling flow of refrigerant into an evaporator. The refrigerant flow through the evaporator cools the evaporator to cause air directed across the outer surface thereof to be cooled prior to passage into the passenger compartment of the vehicle. Return refrigerant flow from the evaporator is through the inlet and outlet of a suction throttling valve interposed between the evaporator and the compressor and operative to maintain a preset control pressure within the evaporator during continuous operation of the compressor.

The suction throttling valve is of the type including a cylinder having a bore therein in which is located a piston valve, spring biased into a closed position. When the piston is in a closed position, the compressor no longer draws refrigerant from the evaporator and the pressure will increase therein. The suction throttling valve includes a control chamber with pressure therein acting on one side of the piston valve, the opposite side of the piston valve is exposed to evaporator pressure. Orifice means communicate the control chamber with the evaporator pressure and the control chamber pressure follows the evaporator pressure to a predetermined level or control pressure point. At this pressure, condition responsive means within the control chamber will operate a needle valve to open communication between the control chamber and the outlet of the suction throttling valve causing the continuously operated compressor to reduce the pressure in the control chamber. When this occurs, the evaporator pressure causes the piston valve to open to cause more refrigerant to pass from the evaporator back to the compressor. This will reduce the pressure in the evaporator and will cause a commensurate reduction in the temperature of the exterior surface of the evaporator to cause increased cooling of air flowing thereacross.

When the pressure in the evaporator is reduced below a given point at which the outer surface of the evaporator can cause water to freeze thereon, the pressure across the piston valve will equalize and a return spring will bias the piston to a closed position to increase the pressure in the evaporator to prevent freeze up. In the present invention, the condition responsive means includes a needle valve which is positioned on a movable valve seat which will move with respect to the needle valve to vary the control chamber pressure at which the condition responsive means will cause the control chamber to be communicated with the continuously operated compressor.

The movable valve seat is operated by manually actuatable control means accessible from the interior of a vehicle compartment. The manually actuatable control has operating modes from a cool to a warm position. When in a cool position, the movable valve seat is positioned away from the needle valve and the needle valve is maintained by the condition responsive means closed until the pressure within the evaporator approaches that pressure at which the exterior of the evaporator will be near freezing. At this point the pressure in the control chamber is reduced to a point where the condition responsive means will move the needle valve away from the movable seat. Shortly thereafter, pressure is equalized across the piston valve causing it to move to a closed position to prevent a further reduction of pres sure within the evaporator. Thus, the evaporator is maintained at a first control temperature slightly above the point at which water will freeze on the outer surface thereof. This is the lowest practical control point. Below this temperature, any moisture in air passing over the evaporator freezes on the evaporator causing it to eventually block air flow into the passenger compartment. This minimum control temperature point will reduce the temperature of air entering the passenger compartment to a point which is uncomfortable to some passengers. In order to moderate the temperature of air into the passenger compartment, the manually actuatable control means are adjusted to position the movable valve seat closer to the needle valve and this will change the operating characteristics of the condition responsive means to delay opening of the needle valve until a higher pressure condition exists in the evaporator. Higher pressure in the evaporator will raise the outside surface temperature of the evaporator and will cause air flow thereacross to be warmed to a slightly greater degree thereby to moderate the temperature of air flow into the passenger compartment.

Further objects and advantages of the present invention will be apparent from the following description, reference being had to the accompanying drawings wherein a preferred embodiment of the present invention is clearly shown.

IN THE DRAWINGS

Figure 1:
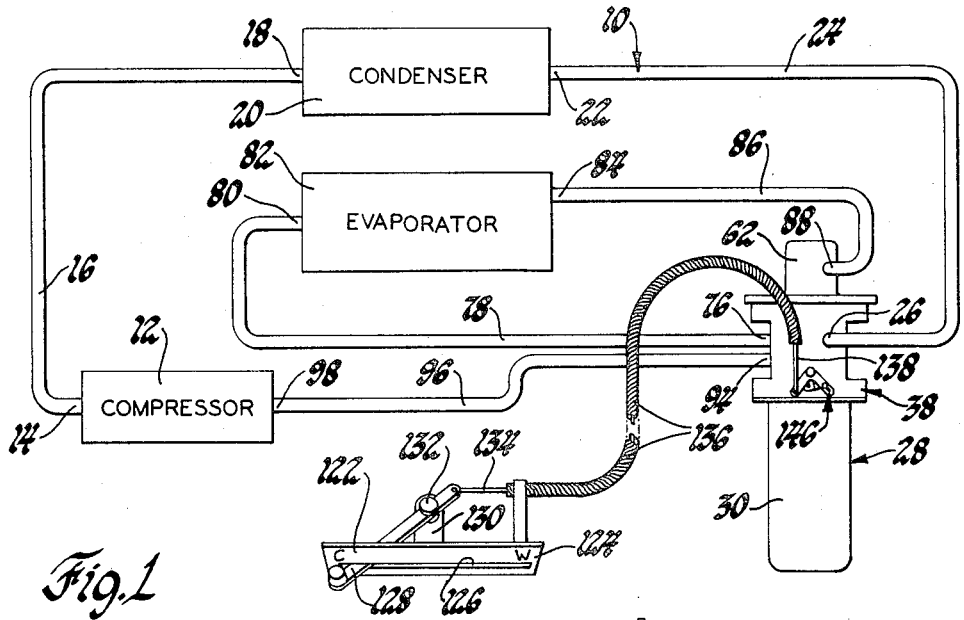
FIG. 1 is a diagrammatic view of an automotive air conditioning system including the present invention.
Figure 2:
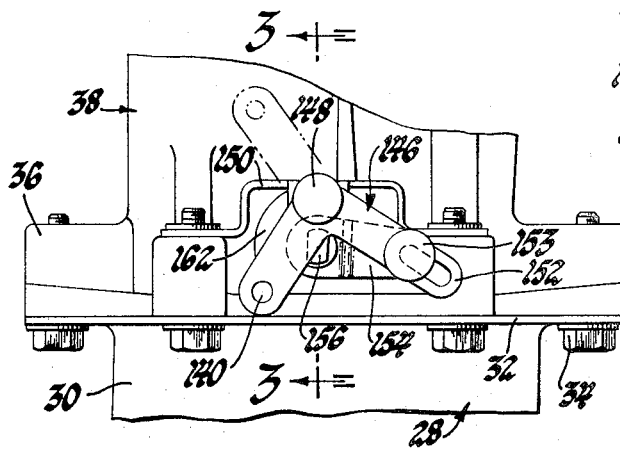
FIG. 2 is an enlarged, fragmentary, front elevational view of a link assembly of the present invention.

Referring now to FIG. 1 of the drawings, a refrigerant system 10 is illustrated including a compressor 12 operated continuously by the engine of a vehicle. It has an outlet 14 connected to a high pressure refrigerant conduit 16 which connects to the inlet 18 of a condenser 20. The outlet 22 of the condenser is connected to a high pressure refrigerant liquid line 24 which connects to an inlet fitting 26 of a combination valve-in-receiver assembly 28 of a type more specifically set forth in United States Pat. No. 3,525,234.

The assembly 28 includes a sheet metal receiver 30 having a radially outwardly directed flange 32 connected by means of screws 34 to an outwardly directed flange 36 of a valve housing 38. A resilient O-ring 39 in the base of housing 38 seals valve housing 38 with respect to receiver 30. The interior 40 of the receiver 30 is communicated with the inlet 26 through passageway means (not shown) so that high pressure liquid from the condenser will collect therein. Any moisture in the refrigerant is removed by a bag of desiccant 42. Liquid from the receiver 30 passes through a filter screen 44 and is directed upwardly through a vertical stand pipe 46 having the upper end 48 thereof supportingly received by a web portion 50 of the valve body 38. It communicates the receiver 30 with an inlet chamber 52 leading to the inlet 54 of an expansion valve 56 more specifically set forth in United States Pat. No. 3,525,234.

For purposes of the present invention, it is only necessary to point out that the expansion valve 56 includes a thermally responsive bulb 58 on one end thereof, located within a hot gas return chamber 60 formed by a cap member 62 having a radially outwardly directed flange 64 connected by means of a plurality of circumferentially located screws 66 to a plurality of lugs 68 on the upper end 70 of the valve body 38. A resilient O-ring 72 is located in the grooved upper face of the end 70 to seal the cap 62 to the valve body 38.

The expansion valve 56 will meter high pressure liquid refrigerant from the chamber 52 into an outlet chamber 74 which is connected to an outlet fitting 76 on the assembly 28. It in turn is connected by a low pressure liquid conduit 78 to the inlet 80 of an evaporator 82. The outlet 84 of the evaporator is connected by a return conduit 86 to a fitting 88 on the cap 62 which communicates with the hot gas return space 60. A suction throttling valve assembly 90 is supported in a recessed opening 92 within the valve body 38 on one side of the expansion valve 56 in spaced parallelism therewith. The recess 92 is connected to an outlet fitting 94 connected to a return conduit 96 leading to the inlet 98 of the compressor 12.

In automotive air conditioning systems the compressor 12 is continuously operated by a belt pulley system from the engine of the vehicle. It will compress gas from the return conduit 96 and will discharge it under high pressure into the condenser 20 where it is cooled to liquefy the refrigerant. High pressure liquid refrigerant is metered by the expansion valve 56 in accordance with the temperature of gas within the space 60 and will flow into the evaporator 82. Heat from air flow across the evaporator 82 will increase the temperature of the liquid refrigerant causing it to vaporize. At the same time the air flow is cooled prior to passage into the vehicle passenger compartment. Refrigerant vapor is directed from the evaporator back into the valve and receiver assembly 28. The suction throttling valve 90 will operate to control flow of refrigerant to the compressor and will thereby control the pressure within the evaporator so as to regulate the outer surface temperature of the evaporator during system operation.

In present air conditioning systems, the suction throttling valve 90 is preset to maintain the outer surface temperature of the evaporator 82 at a point substantially at 32°F. This control temperature is selected to produce maximum cooling of air flow across the evaporator and prevents moisture in the air flow across the evaporator from freezing thereon in a manner which would block air flow into the passenger compartment of the vehicle.

Outlets from typical duct systems for automotive air conditioning systems are located in close proximity to the operator of the vehicle. In some cases, the cooling of air flow across an evaporator maintained at a control point slightly above the freezing point of water will cool the air so that it will be too cold when directed into the passenger compartment. In present systems, to avoid this problem once air is passed across an evaporator, a portion of the air is redirected through a heater core so that the air entering the passenger compartment will be moderated in temperature.

In accordance with certain principles of the present invention, the suction throttling valve 90 includes means for modulating the control pressure within the evaporator so that the temperature of the outer surface of the evaporator can be raised above the set control of 32°F. thereby to warm the inlet air and thereby eliminate the need for passing air from the evaporator across the heater.

Figure 4:
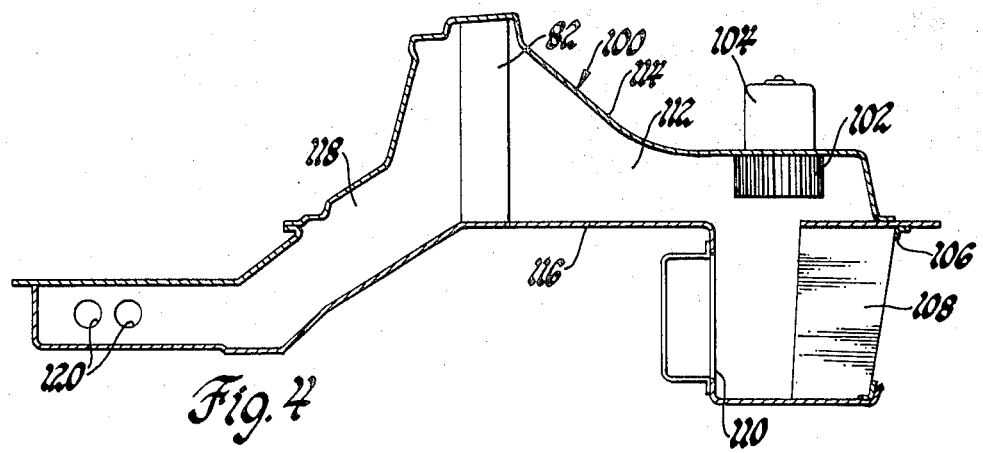
FIG. 4 is a horizontal sectional view of an air duct system utilized with the present invention.
Figure 5:
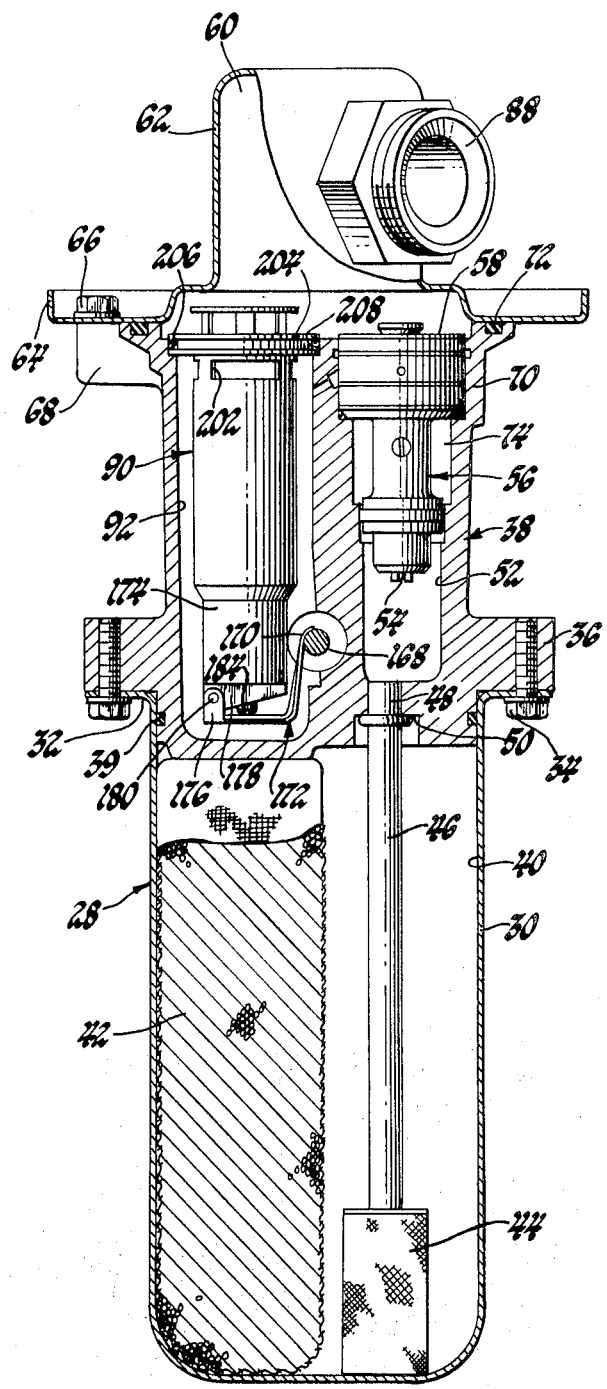
FIG. 5 is an enlarged sectional view of a valve-in-receiver assembly in the present invention.

A typical system including the improved suction throttling valve is associated with an air distributing duct system 100 as illustrated in FIG. 4. It locates the evaporator 82 downstream of an air blower 102 driven by a motor 104. The blower 102 draws air from the outside through an inlet opening 106 which is under the control of an air door 108. The duct system further includes a recirculation opening 110 in the passenger compartment. The air door 108 is movable between the inlet opening 106 and the recirculation opening 110 in accordance with the position of a dash-mounted controller (not shown). In either case, air is drawn from the outside or the inside of the passenger compartment by the blower 102 and discharged through a passageway 112 formed by a housing 114 and a panel 116. Air flow from the evaporator 82 is directed through a passage 118 between the housing 114 and the panel 116 which leads to outlet openings 120 for distributing the cooled air into the passenger compartment. In systems utilizing the present invention the heater core can be located in an independent duct system. Alternatively, the heater core can be located in a duct which is selectively connected to the blower 102 by means of valving of the type well known in the art.

A manually actuated controller 122 is located within the passenger compartment of the vehicle. It includes an indicia plate 124 having a groove 126 therein having a control arm 128 directed therethrough. The control arm 128 is positioned between cool and warm positions.

The control arm 128 is pivoted on a flange 130 by means of a pin 132 and is connected to one end of a cable 134 directed through a sheath 136 leading from the passenger compartment to the valve assembly 28. The opposite end 138 of the cable 134 is connected to one end 140 of a bell crank 146. The bell crank is pivotally connected by means of a pin 148 to a drive link bracket 150. It includes a slotted end 152 which is pivotally connected by means of a pin 153 to one end of a shaft link 154. The shaft link 154 fits over a flat surfaced shaft extension 156.

Accordingly, adjustment of the lever 128 between the cold and warm positions will position the cable 134 so as to rotate the bell crank 146 about the pivot 148 causing angular movement of the shaft link 154 and the shaft end 156.

Figure 3:
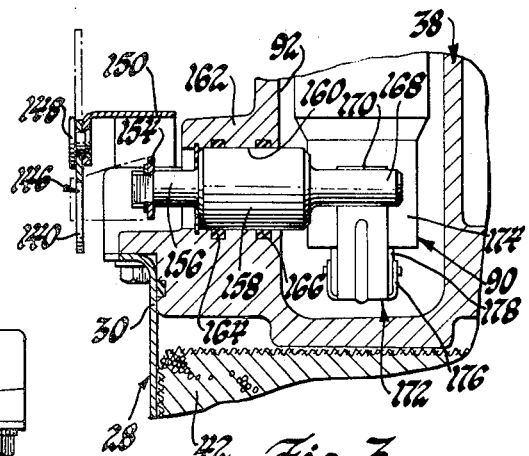
FIG. 3 is a view in vertical section taken along the line 3—3 of FIG. 2.

As best seen in FIG. 3, the shaft extension 156 is connected to an enlarged diameter shaft 158 rotatably supported within a bore 160 in a housing extension 162 on one side of the valve body 38. The large diameter shaft 158 is sealed by a pair of O-rings 164, 166 located in grooves within the housing extension 162. The shaft 158 includes an inwardly directed extension 168 thereon having the axis thereof located eccentrically of the axis of rotation of the shaft 158. The extension 168 bears against the curbed end 170 of an L-shaped seat adjustment lever 172. One leg of the lever 172 is located in spaced parallelism on one side of the body 174 of the valve 90. The other leg thereof has a pair of upstanding tabs 176 thereon located on either side of the body 174 against flat surfaces 178 on either side thereof. A pin 180 is directed through the valve body 174 to pivotally secure the tabs 176 thereon.

The bottom leg 182 of the lever 172 underlies the end 184 of a movable valve seat 186. The valve seat 186 more particularly includes a tubular extension 188 slidably supported in a bore 190 at the lower end of body 174. Extension 188 is sealed with respect to the bore 190 by means of a resilient O-ring 192 seated in a groove 194 formed intermediate the ends of the tubular extension 188. The extension forms a flow control passage 196 which communicates the recess 92 with a pressure control chamber 198 formed on one end of a bore 200 in the valve body 174. The body 174 includes a plurality of circumferentially arcuate, upper end openings 202 therein which communicate the bore 200 with the recess 92.

The valve body 174 also includes a radially outwardly directed upper end flange 204 with a peripheral groove therein in which is seated a resilient O-ring 206 that bears against a counterbore 208 in the upper end of the valve body 38 to seal the hot gas chamber 60 from the recess 92.

The heat 204 is counterbored at 210 to supportingly receive the base 212 of a diverter member 214 which includes a plurality of upstanding legs 216 joined to a top plate 218 that serves to separate any liquid returning to the chamber 60 from the evaporator 82.

Within the bore 200 is located a valve piston 220. It includes an open end 222 and a central recess 224 in communication with a side port 226 leading to a peripheral groove 228. An orifice opening 230 in the lower end of the valve piston 220 communicates the recess 224 with a spring chamber 232 in body 174 located above the control chamber 198 therein. A spring retainer 234 is press fit within a bore 236 at the upper end of the control chamber 198. It includes a plurality of circumferential openings 238 therein to communicate the spring chamber 232 with the control chamber 198. A piston valve return spring 240 has one end thereof supported by the retainer 234 and the opposite end thereof in engagement with one end of the valve piston 220 for biasing the valve piston 220 into a position where an upper circumferential control edge 242 thereon will be located in the bore 200 above the circumferential openings 202 in the body 174 thereby to close communication between the counterbore 210 and the opening 202. This blocks fluid flow between the chamber 60 and the recess 92. When in the closed position, the control edge 242 is against the base 212 of the diverter 214 which is held in place by means of a retaining ring 244 snap fit within a groove formed in the counterbore 210.

A strainer 246 is supported within the valve piston 220 between the upper end thereof and the recess 224 to stop particles in the refrigerant from entering the recess 224 and possibly blocking the restricted orifice passage 230.

In accordance with certain principles of the present invention, the movable valve seat 186 is associated with a pilot valve means including a condition responsive controller 248 and a valving element shown as a needle valve 250. More particularly, the controller includes an evacuated bellows 252 having an end closure 254 connected to the spring retainer 234. The opposite end of the bellows 252 is closed by a needle valve guide member 256 which secures the needle valve 250 axially with respect to the bellows 252. The upper end of the needle 250 is tapered at 260 and guided into a recess 262 in the closure 254 for overtravel movement of the needle 250 inwardly of the bellows 252. A control spring 264 located interiorly of the bellows 252 has one end thereof secured to the closure 254 and the opposite end thereof carried by the guide member 256 with the control spring 264 being coiled around and spaced from the outer surface of the needle valve 250. The condition responsive controller 248 is spring biased with respect to the upper surface of the movable valve seat 186 by means of a spring 266 seated between the guide member 256 and a recessed upper surface 268 on the valve seat 186.

The piston valve 220 is positioned opened and closed by a pressure differential formed thereacross under the control of the condition responsive controller 248 which maintains a substantially constant pressure in the control chamber 198 for each setting of the movable seat 186.

More particularly, the suction throttling valve 90 functions to maintain a preset control pressure in the evaporator 82 as follows. Assuming that the evaporator is to be maintained at a minimum temperature, the controller 90 is calibrated to establish an operating pressure therein of from 29 – 30 lbs. gage pressure. The internal spring 264 within the bellows 252 and a predetermined pressure within the bellows 252, in one working embodiment 0 psig, determines the pressure at which the bellows 252 will collapse. When the bellows collapses, the needle valve 250 moves away from the valve seat 186 to open communication between the control chamber 198 and the recess 92 which in turn is in direct communication with the suction side of the compressor. When the seat adjustment lever 172 is positioned by the controller in a cool position, the lever arm 182 will be moved away from the end of the valve body 174 and the spring 266 will move the valve seat 186 so that a stop surface 270 thereon will seat against a valve body surface 272. The spring 264 and the bellows pressure 252 will maintain the needle valve 250 closed as long as the pressure in the evaporator is near or at 29 – 30 psig. As the pressure in the evaporator increases to raise the temperature of the evaporator above the desired minimum temperature control condition, the pressure is directed through the opened end of the valved piston and the recess 224 thence through the orifice 230 to increase the pressure within the control chamber 198. The pressure is trapped in the chamber by the needle valve 250 closed against the valve seat 186. The increased pressure within the control chamber 198 causes the bellows and spring 264 to collapse and thereby draw the needle valve 250 away from the seat 186. At this point, continuous operation of the compressor will reduce the pressure in the control chamber 198 by flow of refrigerant therefrom through the passage 196 and the recess 92 thence through the return conduit 96 to the compressor inlet 98. When the pressure is reduced in the control chamber, it is commensurately reduced in the spring chamber 232 and the pressure differential across the closed, valved piston 220 will be such that the valve piston 220 will move within the bore 200 to cause the control edge 242 to move below the side openings 202. This will cause the compressor to be directly communicated with the evaporator so as to reduce the pressure within the evaporator back to a desired point to maintain a minimum temperature on the outer surface thereof.

In accordance with certain principles of the present invention, this phase of operation of the evaporator may tend to cool air flow into the passenger compartment too much. In order to compensate for this, the controller 128 is moved from the maximum cold position toward the warm position. This will cause the bell crank 146 to rotate in a counterclockwise direction and will rotate the shaft 158 in a like direction. Rotation of the eccentrically located extension 168 in the counterclockwise direction will cause the seat adjustment lever arm 172 to move closer to the side of the body 174 and will move the arm portion 182 upwardly against the valve seat end 184 to move the valve seat 186 upwardly within the control chamber 198 to carry the needle valve 250 into the bellows 252. This will compress the bellows and spring 264.

Figure 6:
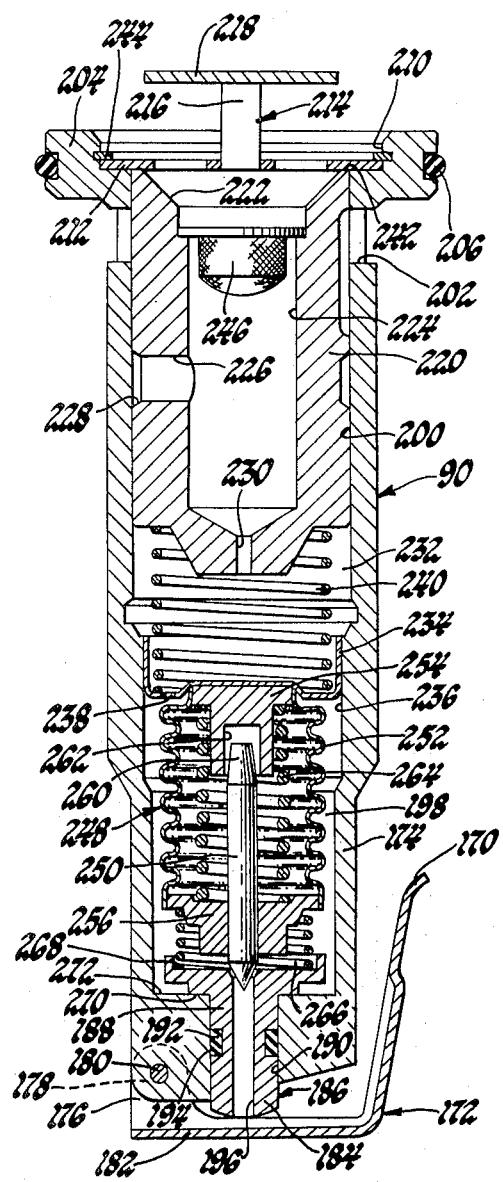
FIG. 6 is a sectional view of a suction throttling valve of the present invention.

Once the movable valve seat 186 is readjusted into a warmer position as described above, the control operation of the condition responsive controller 248 functions in the following manner to maintain the pressure within the evaporator at a higher control point to produce a higher outside surface temperature of the evaporator thereby to moderate the temperature of the cold air passing into the passenger compartment. More particularly, when the movable valve seat 186 has been moved interiorly of the control chamber 198, the stop 270 is moved from the surface 272 to contract the bellows 252 and compress the spring 264. With the valve piston 220 in its closed position as shown in FIG. 6, the pressure in the evaporator will increase to the adjusted pressure control point. As the pressure increases, it will be directed through the orifice passage 230 into the control chamber 198. The pressure will increase in the chamber 198 to a point in excess of the minimum control pressure since the added force of the compressed spring 264 will delay collapse of the bellows and spring until a higher pressure is attained in the control chamber 198. Thus, the controller 248 and the new position of the valve seat 186 combine to serve as a means for maintaining a higher constant pressure in the control chamber 198.

Once the needle valve 250 is opened, the compressor will draw down the pressure in the control chamber 198 and thereby reduce the pressure in the spring chamber 232 so that the pressure within the evaporator will cause a pressure differential across the piston valve 220 to open it only when a greater pressure exists in the evaporator than the control point under minimum conditions. The piston valve 220 will open when the greater pressure is set in the evaporator to cause refrigerant to flow directly from the evaporator to hold the new control pressure therein.

In one working embodiment of the invention, positioning of the adjustable valve seat 186 into a maximum warm position enabled a maximum evaporator pressure of 50 p.s.i.g. to be obtained. Comfortable operating temperatures of air passing into the compartment are obtainable by the system through an ambient range of 70°–100°F. Under conditions where ambient temperatures are under 70°F. and the air conditioning system is operated, it is desirable to provide an additional heat source in the duct system to further moderate the temperature of air flow into the system.

Representative operating conditions of the system under various ambient temperatures, and vehicle speeds are set forth in the following chart.

PERFORMANCE SUMMARY

| Temperature Ambient °F. | Vehicle Speed | POA Control Press. (PSIG) Max. | Min. | Discharge Air Temperature °F. Max. | Min. |
|---|---|---|---|---|---|
| 70 | 25 | 30 | 49.5 | 38.8 | 56.8 |
|  | 40 | 30 | 50 | 40.0 | 58.0 |
|  | 60 | 30.5 | 50 | 41.2 | 58.8 |
| 80 | 25 | 30 | 49 | 42 | 58.2 |
|  | 40 | 31 | 50 | 41.3 | 54.7 |
|  | 60 | 31 | 50 | 42.0 | 59.5 |
| 90 | 25 | 28.5–32 | 50 | 45.7 | 60.3 |
|  | 40 | 28–32 | 50 | 44.0 | 60.3 |
|  | 60 | 27–32.5 | 50.5 | 44.0 | 61.0 |
| 100 | 25 | 30 | 50 | 49.3 | 61.7 |
|  | 40 | 28–33 | 50.5 | 49.0 | 62.2 |
|  | 60 | 28–33 | 51.0 | 48.2 | 62.5 |

In an arrangement of this type, modulation of the control pressure in the evaporator 82 is obtained smoothly and is quite repeatable under a wide range of operating conditions as illustrated above. The modulating mechanism described above does not penalize valve performance under maximum cooling conditions. The suction throttling valve 90 is set to a minimum pressure prior to installation into the housing 38 and connection of the manually actuatable controller 122 on a vehicle. This prevents inadvertent freeze up of the evaporator by miscalibration of the system during factory installation.

While the embodiments of the present invention, as herein disclosed, constitute a preferred form, it is to be understood that other forms might be adopted.

What is claimed is as follows:

1. A controller for a vehicle air conditioning system of the type including air duct means having an evaporator therein for cooling outside air prior to passage thereof into a vehicle and means for supplying refrigerant to the evaporator including a continuously operated motor-driven compressor comprising: suction throttling valve means having an inlet adapted to be connected to the outlet of the evaporator and an outlet adapted to be connected to the compressor inlet, a double-ended piston valve for controlling flow of refrigerant between the inlet and outlet having one end exposed to evaporator pressure, means forming a control chamber at the opposite end of said piston valve, orifice means for communicating said control chamber with evaporator pressure, outlet means communicating said control chamber with said outlet including a movable valve seat, pilot valve means within said control chamber including means responsive to operating conditions of said evaporator and a valving element positioned by said condition responsive means to be positioned with respect to said movable valve seat for opening and closing communication between said control chamber and the outlet of said suction throttling valve means, means for modulating the controlling action of said condition responsive means including an actuator member engageable with said movable valve seat for moving said seat with respect to said valving element, manually actuatable means operatively connected to said actuator member to position said movable seat with respect to said valving element to vary the point at which said valving element moves away from said movable valve seat so as to communicate said movable valve seat with the outlet of the suction throttling valve means thereby to vary the point at which a pressure differential will occur across said piston valve to vary the control of return of refrigerant from the evaporator to the compressor so as to maintain a variably controlled operating temperature in said evaporator and a variably controlled air temperature passing from said evaporator into the passenger compartment.

2. A suction throttling valve for controlling the flow of refrigerant between an evaporator and a continuously operated compressor in an automotive air conditioning system comprising: a suction valve housing having an inlet and an outlet, a valve body including a bore therein, a piston valve slidaby supported within said bore for reciprocation therein, one end of said piston valve being in direct communication with the inlet of said suction throttling valve to be exposed to evaporator pressure, means including said bore for forming a control chamber on the opposite end of said piston valve, means including a movable valve seat forming an outlet from said control chamber for communicating it with said suction throttling valve housing outlet, orifice means for directing pressure from said evaporator into said control chamber, condition responsive means within said control chamber responsive to pressure within said control chamber, a valving element connected to said condition responsive means and movable with respect to said movable valve seat to open and close communication between said control chamber and the outlet of said suction throttling valve housing, an actuator member on said suction throttling valve for positioning said movable valve seat with respect to said valving element to change the operating point of said condition responsive means, manually actuatable control means operably connected to said actuator member for presetting the movable valve seat at a predetermined point with respect to said valving element, said condition responsive means maintaining said valving element closed against said movable valve seat until a predetermined pressure occurs in said control chamber wherein said valving element is moved from said movable valve seat to cause the control chamber to be communicated with the outlet of said suction throttling valve housing thereby to reduce the pressure within said control chamber to a point at which the pressure differential across said piston valve will be at a point at which it will be biased into a closed position in order to maintain the pressure within said evaporator at a set pressure point corresponding to the position of said movable valve seat as established by said manually actuatable control means thereby to vary control of temperature of air passing into the passenger compartment from the evaporator.

3. A suction throttling valve for controlling the flow of refrigerant between an evaporator and a continuously operated compressor in an automotive air conditioning system comprising: a suction valve housing having an inlet and an outlet, a valve body including a bore therein, a double-ended piston valve slidably supported within said bore for reciprocation therein between open and closed positions, one end of said piston valve being in direct communication with the inlet of said suction throttling valve to be exposed to evaporator pressure, means including said bore for forming a control chamber on the opposite end of said piston, means including a movable valve seat forming an outlet from said control chamber for communicating it with said suction throttling valve housing outlet, orifice means for directing pressure from said evaporator into said control chamber, an evacuated bellows means within said control chamber responsive to pressure within said control chamber, spring means biasing said piston valve closed, a needle valve connected to said bellows and movable with respect to said movable valve seat to open and close communication between said control chamber and the outlet of said suction throttling valve for reducing the pressure difference across said piston valve to open it against said spring means, an actuator member on said suction throttling valve for positioning said movable valve seat against said needle valve to compress said bellows means to change the pressure at which said needle valve opens, manually actuatable control means operably connected to said actuator member for presetting the movable valve seat at a predetermined point with respect to said needle valve, said bellows means maintaining said needle valve closed against said movable valve seat until a predetermined pressure occurs in said control chamber wherein said needle valve is moved by collapse of said bellows means open to cause the control chamber to be communicated with the outlet of said suction throttling valve housing thereby to reduce the pressure within said control chamber to a point at which the pressure differential across said piston valve will be at a point at which said valve will be biased into a closed position in order to maintain the pressure within said evaporator at a set pressure point corresponding to the position of said movable valve seat as established by said manually actuatable control means thereby to vary control of temperature of air passing from the evaporator.

4. A manually adjustable air temperature controller for an automobile air conditioning system comprising: duct means having an inlet in communication with exterior air and an outlet in communication with the interior of a vehicle, evaporator means located within said duct, means for circulating air from the inlet of said duct means across said evaporator means and through said outlet, a refrigerant compressor, a condenser, expansion valve means and means for connecting said compressor, condenser and expansion valve in refrigerant flow relationship with said evaporator for maintaining a reduced temperature at said evaporator for cooling air flow thereacross, a suction throttling valve having an inlet and an outlet connected between said evaporator and said compressor for regulating the pressure within said evaporator, said suction throttling valve having a two-ended piston valve therein with one end exposed to the evaporator pressure, means forming a pressure control chamber in said valve on the opposite end of said piston, outlet means from said control chamber including a movable valve seat for communicating said control chamber with the outlet of said suction throttling valve, a valving element movable with respect to said movable valve seat for opening and closing communication between said control chamber and the outlet of said suction throttling valve, condition responsive means within said control chamber for positioning said valving element with respect to said movable valve seat, orifice means for communicating said control chamber with the evaporator pressure, said condition responsive means responsive to a predetermined set evaporator pressure to move said valving element with respect to said movable seat to change the pressure within said control chamber thereby to produce a controlled pressure differential across said piston valve for permitting flow of refrigerant between the inlet and outlet of said suction throttling valve to control the evaporator at the set pressure, operator means on said suction throttling valve engageable with said movable valve seat for shifting the position of said movable valve seat within said control chamber, manually actuatable means accessible from the passenger compartment of the vehicle operatively connected to said actuator member, said manually actuatable control means operative to shift said movable valve seat within said control chamber to vary the set pressure at which said condition responsive means will operate said valving element to produce a pressure differential across said piston valve to permit refrigerant flow between the inlet and outlet of said suction throttling valve thereby to change the operating pressure within said evaporator to vary cooling of air flow thereacross.

5. A suction throttling valve for an automotive refrigerant system to maintain a controlled evaporator pressure comprising: a housing having an inlet and an outlet therefrom, a cylinder including a bore therein communicating with said inlet and outlet, a double-ended piston valve member located within said bore having one end exposed to evaporator pressure and movable with respect thereto for varying the refrigerant flow between the inlet and outlet so as to maintain a controlled pressure condition in the evaporator, spring means for urging said piston into a closed position to increase the pressure within said evaporator, means including said bore forming a pressure control chamber on the other end of said piston, orifice means communicating said control chamber with the evaporator, means forming an outlet from said control chamber including a movable valve seat, said orifice means operating to cause the pressure within said control chamber to approach the pressure within said evaporator when said piston valve is closed, condition responsive means within said control chambers including a valving element movable toward and away from said movable seat for controlling said outlet means to reduce the pressure within said control chamber when said needle valve is positioned away from said movable valve seat, spring means for urging said piston valve to close communication between the inlet and outlet of said suction throttling valve when the pressure within said control chamber is reduced, said condition responsive means responding to a predetermined reduction of pressure within said control chamber to close said needle valve to produce a pressure differential across said piston valve to open communication between the inlet and outlet on said movable valve seat interacting with said needle valve to establish the point of control at which the condition responsive means will open the needle valve to cause the control chamber pressure to be reduced to return the piston valve to a closed position, manually actuatable means accessible from the passenger compartment of a vehicle for positioning said movable valve seat to establish a predetermined control point at which the needle valve will open thereby to control the modulating control action of said piston valve to vary the operating temperature of said evaporator in accordance with the position of said manually actuatable control means to control the temperature of air passing from the evaporator into the passenger compartment of a vehicle.

6. A suction throttling valve for an automotive refrigerant system to maintain a controlled evaporator pressure comprising: a housing having an inlet and an outlet therefrom, a cylinder including a bore therein communicating with said inlet and outlet, a double-ended piston valve located within said bore having one end exposed to evaporator pressure and movable with respect thereto into open and closed positions for varying the refrigerant flow between the inlet and outlet so as to maintain a controlled pressure condition within the evaporator, spring means for urging said piston into a closed position to increase the pressure within said evaporator, means including said bore forming a pressure control chamber at the other end of said piston valve, orifice means communicating said control chamber with the evaporator, means forming an outlet from said control chamber including a movable valve seat, said orifice means operating to cause the pressure within said control chamber to approach the pressure within said evaporator when said piston valve is closed, condition responsive means within said control chamber including a valving element movable toward and away from said movable seat for controlling said outlet means to reduce the pressure within said control chamber when said valving element is positioned away from said movable valve seat, said condition responsive means responding to a predetermined reduction of pressure within said control chamber to close said valving element to produce a pressure differential across said piston valve to oppose said spring means to open communication between the inlet and outlet, said movable valve seat interacting with said valving element to change the operating point of control at which the condition responsive means will move the valving element to cause the control chamber pressure to be reduced to return the piston valve to a closed position, manually actuatable means for positioning said movable valve seat to establish a predetermined control point at which the valving element will open thereby to control the control action of said piston valve to vary the operating pressure of said evaporator in accordance with the position of said manually actuatable control means thereby to control the temperature of air passing from the evaporator into the passenger compartment of a vehicle.

* * * * *